United States Patent
Martin et al.

[15] 3,662,495
[45] May 16, 1972

[54] HYDROSTATIC TRANSMISSION SYSTEMS

[72] Inventors: Anthony Eugene Joseph Martin, Birmingham; Robert Thomas John Skinner, Kenilworth; Bernard James Baker, Wilnecote, Near Tamworth, all of England

[73] Assignee: Joseph Lucas (Industries) Limited, Birmingham, England

[22] Filed: Sept. 17, 1970

[21] Appl. No.: 73,066

[52] U.S. Cl. ................................60/19, 60/52 SR, 60/53 R
[51] Int. Cl. ...........................................F02b 41/00
[58] Field of Search ........................60/19, 52 SR, 53 R

[56] References Cited

UNITED STATES PATENTS

| 2,326,821 | 8/1943 | Boyle | 60/19 |
|---|---|---|---|
| 3,003,309 | 10/1961 | Bowers et al. | 60/19 |
| 3,036,426 | 5/1962 | Brueder | 60/19 X |
| 3,225,618 | 12/1965 | Page | 60/19 X |
| 3,233,409 | 2/1966 | Reis | 60/53 R X |

*Primary Examiner*—Edgar W. Geoghegan
*Attorney*—Holman & Stern

[57] ABSTRACT

A hydrostatic transmission in which a pump displacement varying unit controlled by a servo valve is in turn controlled by a lever movable in one direction by a pump output pressure sensing device and in the other direction by a motor speed sensing device. The unit has a feedback connection to the lever which varies the position of the fulcrum of the lever relative to the above mentioned devices.

9 Claims, 3 Drawing Figures

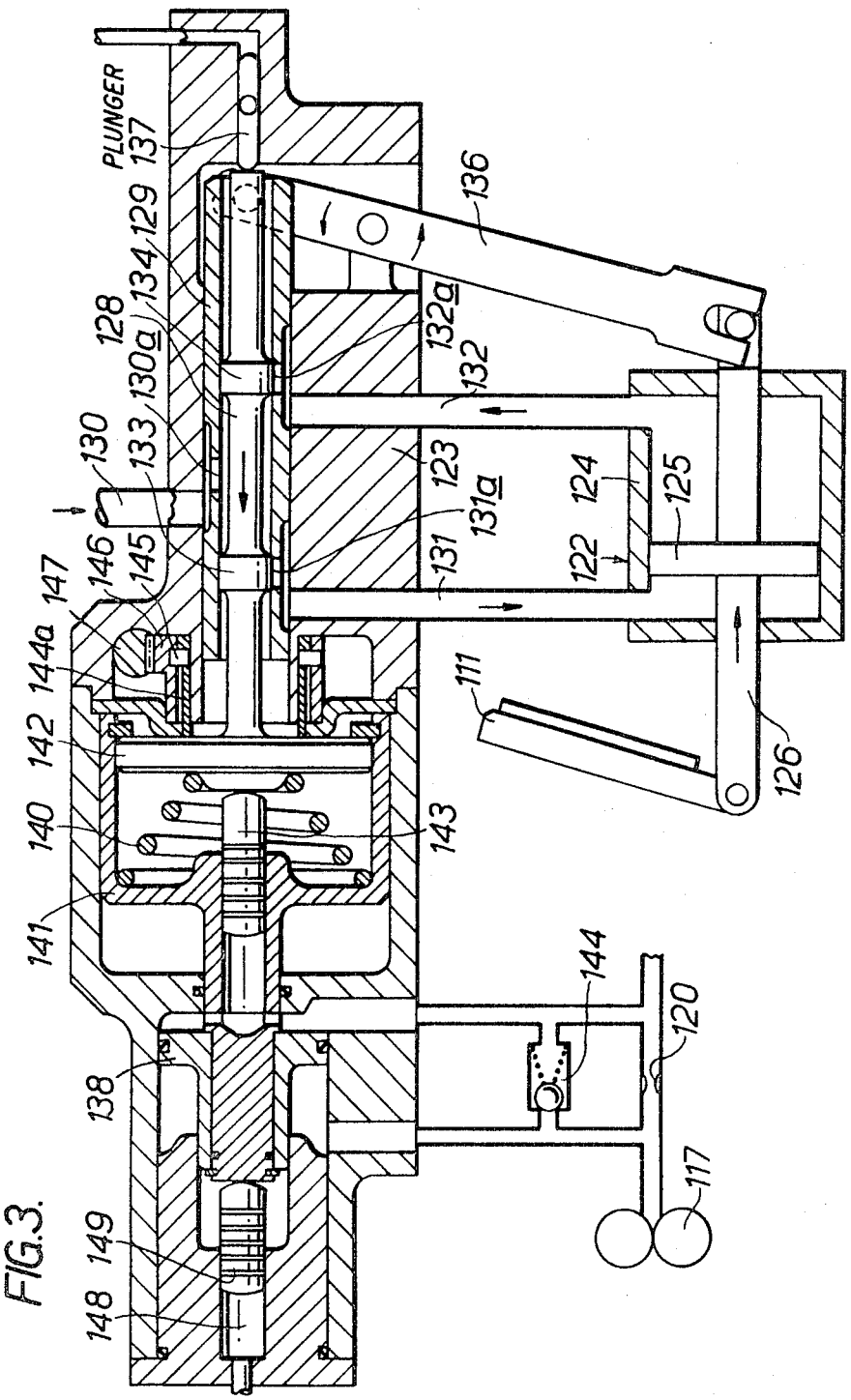

3,662,495

HYDROSTATIC TRANSMISSION SYSTEMS

BACKGROUND OF THE INVENTION

This invention relates to hydrostatic transmission systems for use in road vehicles.

SUMMARY OF THE INVENTION

An hydrostatic transmission system in accordance with the invention comprises an hydraulic pump of variable displacement arranged so as to be driven by an engine in use, hydraulic motor connected to receive liquid from the pump and drivingly connected to vehicle wheels, said motor being arranged to be of constant displacement at least when the system is in use, a hydraulic pump displacement varying unit connected to the pump for varying the displacement thereof, a servo valve controlling the supply of pressurized liquid to the displacement varying unit, said valve including a pair of relatively movable parts which can occupy a datum position relative to one another, relative movement of said parts in one direction effecting supply of liquid to the displacement varying unit to decrease the displacement of the pump and relative movement of said parts in the opposite direction effecting supply of liquid to the displacement varying unit to increase the displacement of the pump, means sensitive to the delivery pressure of the pump and acting on said valve to urge said parts to move relatively to one another in said one direction with a force which increases with said delivery pressure, engine speed sensing means acting on said valve to urge said parts to move relatively to one another in said opposite direction with a variable force dependent on the engine speed, and feedback means mechanically coupling the displacement varying unit to the valve so as to cause the valve parts to occupy their datum position when the pump displacement is such that the pump delivery pressure attains a value appropriate to the existing engine speed and pump capacity. In the accompanying drawings:-

BRIEF DESCRIPTION OF THE DRAWINGS

FIG. 3 is a diagrammatic representation of another example of the invention.

DETAILED DESCRIPTION OF THE INVENTION

Figure 1:
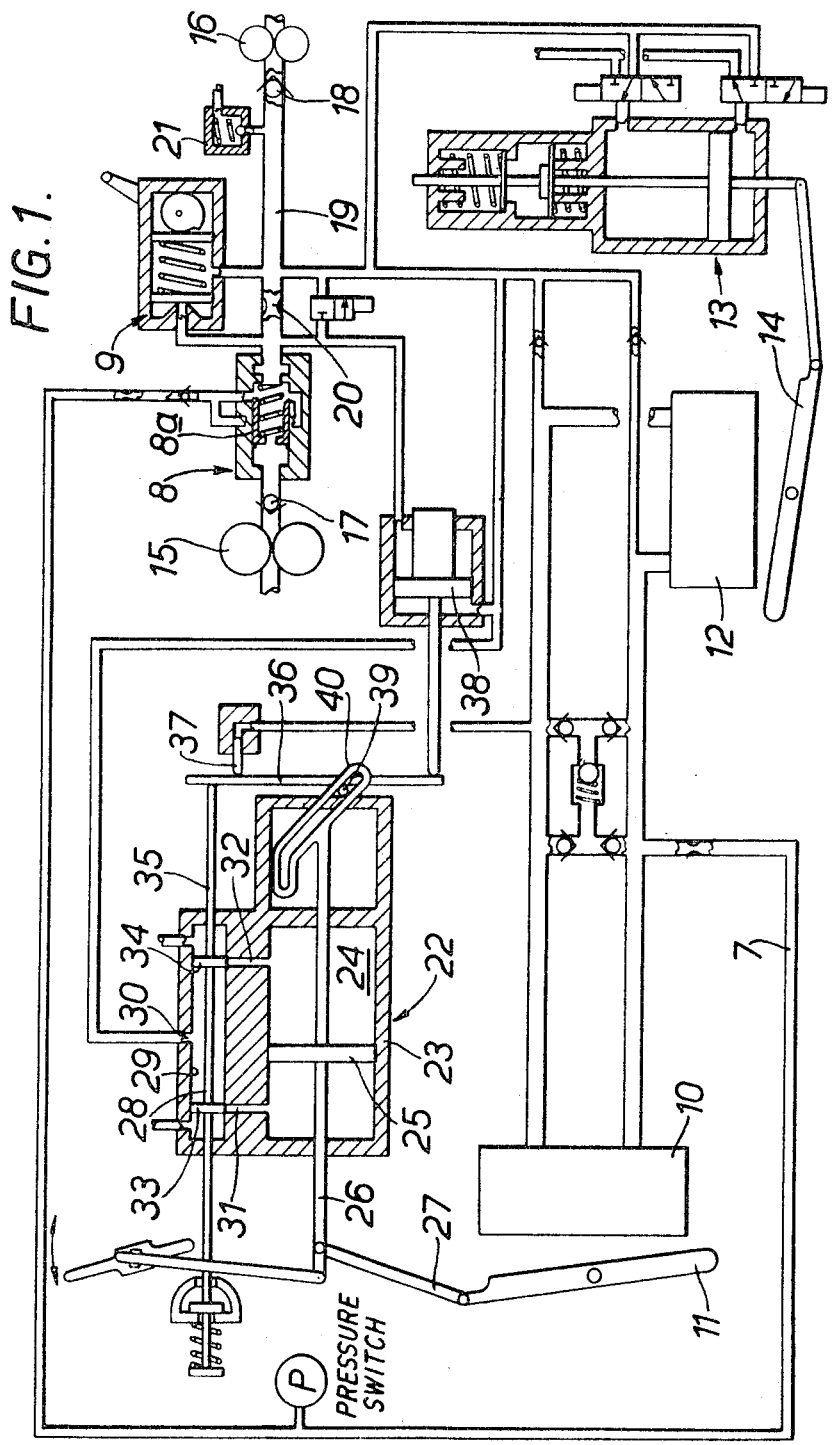
FIG. 1 is a diagrammatic representation of one example of a transmission system in accordance with the invention.
Figure 2:
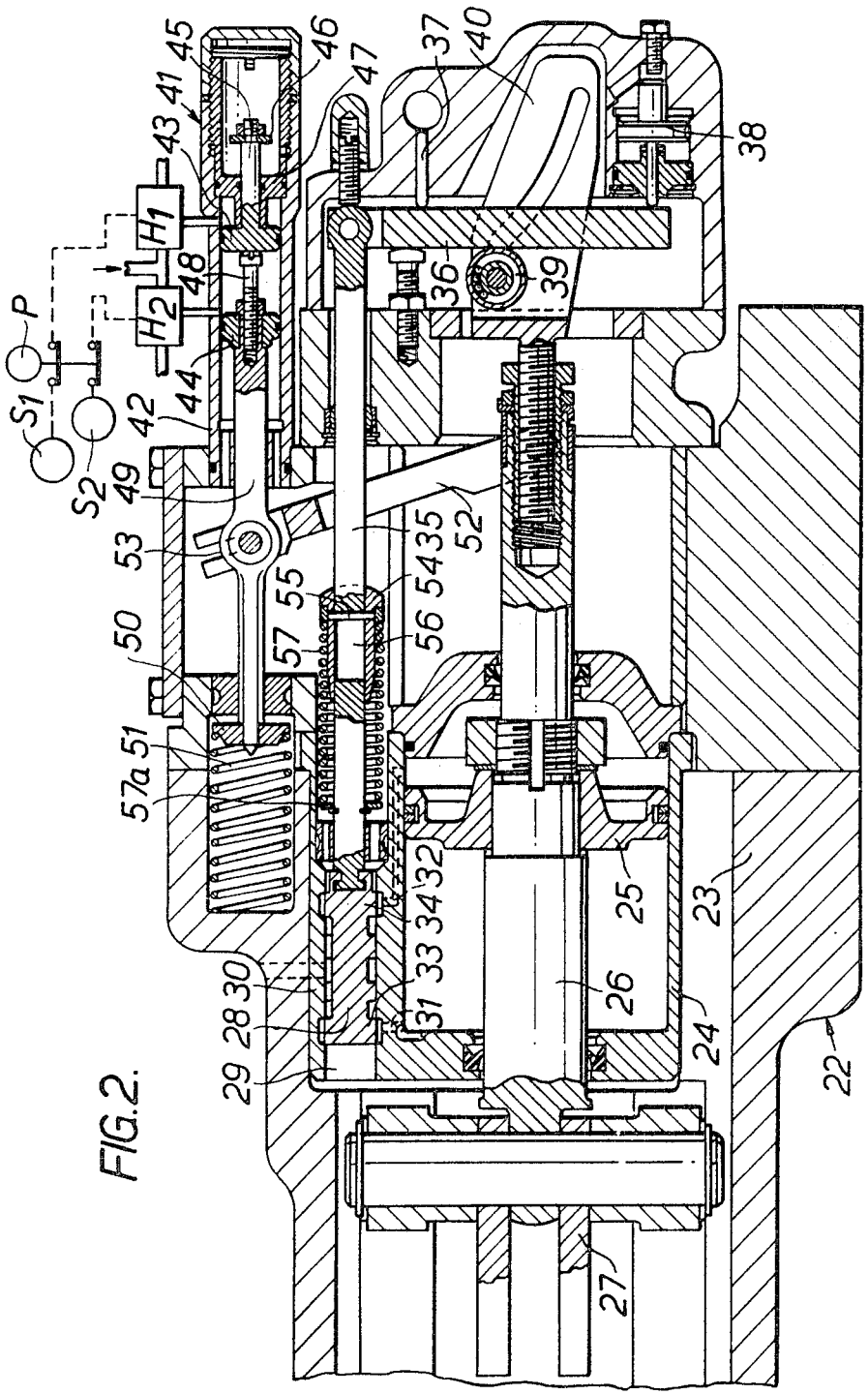
FIG. 2 is a cross-section through a pump displacement varying unit forming part of the system shown in FIG. 1.

Referring firstly to the example shown in FIGS. 1 and 2, the system includes a main transmission pump 10 which is connected to the vehicle engine to be driven thereby. This pump is of variable displacement, being a pump of the swash plate type having a swash plate 11 of variable inclination. The pump is hydraulically connected to a motor 12 which is of a similar type but which has a servo-mechanism 13 which can situate swash plate 14 of the motor 12 in three positions only, namely a forward drive position, a neutral position and a reverse drive position. Thus, in use, in the forward drive position, the motor 12 is effectively a fixed displacement motor.

The system also includes an engine driven boost pump 15 which is driven at a speed proportional to the engine speed and an axle driven boost pump 16 driven at a speed proportional to the axle speed. The outlet of these two pumps communicate via non-return valves 17, 18 respectively with a boost pressure line 19. In the case of the engine driven boost pump 15, there is also an engine overrun limiting device 8 (to be described hereinafter) and a fixed flow restrictor 20 connected in series between the non-return valve 17 and the boost pressure line 19. The pressure in the boost pressure line 19 is controlled by a relief valve 21 so that a constant boost pressure is available in the line 19 for the system make-up and operation of various servo-mechanisms in the system. It will be noted that pressure is available in the line 19 both in the normal drive conditions when pressurized fluid will be supplied thereto both from the pumps 15 and 16 and during towing when the pressure is supplied by the pump 16 only. A relief valve 9 is connected across the restrictor 20 to limit the pressure drop through this restriction.

For controlling the displacement of the pump 10, there is provided a pump displacement varying unit 22 which is shown in detail in FIG. 2. This unit includes a body 23 defining a cylinder 24 in which a piston 25 is slidable. A piston rod 26 attached to piston 25 is linked by means of a linkage 27 to the pump swash plate 11. A valve spool 28 slidable in a bore 29 in the body 23 controls the supply of pressurized fluid from the boost line 19 to the cylinder 24 on opposite sides of the piston 25. The bore 29 has an inlet port 30 connected to the boost line 19 and a pair of outlet ports 31, 32 connected to opposite ends of the cylinder 24. A pair of spaced apart lands 33, 34 on the spool 28 respectively control the ports 31, 32.

The valve spool 28 is shown in an equilibrium position such that both of the ports 31, and 32 are closed by their associated lands 33, 34. The arrangement is such that movement of the valve spool 28 to the left as seen in FIG. 2 will open the port 31 to the port 30 so that a boost pressure is applied at one side of the piston and the land 34 will uncover the port 32 to allow communication with the interior of the body of the unit 22 which is maintained at a low pressure. Thus, the piston 25 will be caused to move to the right as seen in FIG. 2 thereby causing a decrease in the pump capacity. Similarly, movement of the valve spool 28 to the right as seen in FIG. 2 will cause movement of the piston 25 to the left, thereby increasing the pump capacity.

The spool 28 is connected by means of a longitudinally movable link 35, parallel with the piston rod 26 of piston 25, to one end of a lever 36 in a chamber in the body. This lever 36 is acted upon at said one end by a plunger 37 which is slidable in a bore connected to the delivery port of the pump 10. The lever 36 is acted upon at the opposite end by a differential piston device 38 of which the larger area side of the piston is connected to the boost line 19 and the smaller area side thereof is connected to the outlet of the engine driven boost pump 15 between the non-return valve 17 and the restrictor 20. The device 38 therefore applies to the lever 36 a force which is dependent on the rate at which fluid flows through the restrictor 20, with this being dependent on the engine speed. In a specific example, the areas of the two sides of the piston of the device 38 by the device 38 until the engine speed reaches 650 r.p.m. From 650 to 1,000 r.p.m., the force applied by the device 38 increases until a maximum force, determined by the relief valve 9 is applied at speeds of 1,000 r.p.m. and over.

The lever 36 can rock about a roller 39 so that the force applied to the lever 36 by the plunger 37 tends to cause movement of the valve spool 28 to the left as shown in FIG. 2 whereas the force applied to the lever 36 by the differential piston device 38 tends to move the valve spool 28 to the right as shown in FIG. 2. The roller 39 is guided for movement in a direction perpendicular to the direction of movement of the piston 25. Movement of the roller 39 is effected by means of a cam 40 on the piston rod 26 of the piston 25. This cam is arranged to displace the roller towards the device 38 as the piston moves to the left as viewed in FIG. 2.

The plunger 37 provides an indication of the torque applied to the axle and the force applied by it increases as the torque increases. As mentioned above, the device 38 provides a force dependent on the engine speed and this force increases with the engine speed. Movement of the roller 39 provides a feedback between the piston 25 and the valve spool 28 so that for any given engine speed, the torque which is required to balance the lever will vary according to the position of the piston 25.

On acceleration, the force applied to the lever 36 by the device 38 will cause the lever 36 to turn about the roller 39 in a clockwise direction thereby moving the valve spool 28 to the right to increase the pump stroke. This will result in an increased pressure at the delivery port of the pump so that the force applied by the plunger 37 to the lever 36 will increase correspondingly until the valve spool 28 is brought back to its equilibrium position, thereby locking the piston 25 in position. Similarly, on deceleration, the force applied to lever 36 by the plunger 37 will turn the lever 36 in a counter-clockwise direction, thus moving the valve spool 28 to the left and causing de-stroking of the pump, until equilibrium is restored.

It will be noted that the cam 40 has a straight portion parallel to the piston rod 26 at its left hand end, which operates to limit the transmission pressure, and a profiled portion at its right hand end which is arranged to schedule transmission pressure in order to maintain constant applied torque. The relief valve 9 has a variable loading spring which is coupled to the driver accelerator pedal to control the relief pressure of this valve. This gives the driver the facility to vary the tractive effort of the transmission over a part of the travel of the accelerator pedal.

Should the driver of the vehicle be required to hold the transmission in a low gear, he can operate one or both of a pair of electrical switches S1, S2 which are connected respectively to a pair of solenoid valves H1 and H2 as shown in FIG. 2. These valves control the supply of pressure from the boost line 19 to an over-ride mechanism incorporated in the pump displacement varying unit. This over-ride mechanism includes a three position piston and cylinder unit 41 which comprises a cylinder 42 and a pair of pistons 43, 44 slidable in the cylinder 42. The piston 43 has a piston rod 45 on which there is a stop 46 for co-acting with an adjustable guide 47 for the piston rod 45. The piston 44 has an adjustable abutment 48 engageable with the piston 43. A piston rod 49 is secured to the piston 44 and is connected at the opposite end to a disc 50 which is acted upon by a spring 51 which urges the piston 44 to the right as viewed in FIG. 2. Thus, when both valves H1 and H2 are de-energized the spring 51 will urge the pistons 43 and 44 to the positions shown. When valve H1 is energized by closing a switch S1, the piston 43 will move to the left to a position determined by the stop 46 and will move the piston 44 through an intermediary of the adjustable abutment 48. When valve H2 is energized through the switch S2, the piston 44 will move further to the left to a position determined by the engagement between the piston 44 and the end of the cylinder 42. Thus, the piston rod 49 can be positioned, by controlling the switches S1 and S2, in any one of three positions.

A bifurcated arm 52 is pivotally connected at one end to the piston rod 26 and straddles the rod 35. The opposite end of the arm 52 is connected by a pin and slot connection 53 to the rod 49, with the rods 26, 35 and 49 being arranged in spaced parallel relationship. Slidably mounted on the rod 35 is a sleeve 54. A pin engaged with the sleeve 54 extends through a slot 56 in the rod 35 and a spring 57 on the rod 55 acts between the sleeve 54 and an abutment 57a on the rod 35 to urge the sleeve 56 towards the lever 36 to a limiting position such that the rod 55 engages one end of the slot 56.

When the pistons 43, 44 are in the position shown, the pin and slot connection 53 between the rod 49 and the arm 42 is so disposed that swinging of the arm 52 resulting from movement of the piston 25 does not bring the arm 52 into engagement with the sleeve 54. Thus, in this condition, the over-ride mechanism is out of service and plays no part whatever in the control of the piston 25. When the rod 49 is moved by operation of switch S1 to its intermediate position, there will be a position of the piston 25 such that the arm 52 contacts the sleeve 54. Should the automatic control attempt to operate to move the piston further to the left to further increase the displacement of the pump, the arm 52 will engage the sleeve 54 and the spring 57 will thereby apply a force to the rod 35 tending to move this rod to the left so that pressure will be applied to the left-hand side of the piston 25 preventing further movement of the piston in that direction. When the piston rod 49 is in its third position, i.e. when it is in an extreme position in a left-hand direction, the piston 25 will be prevented from moving to increase the capacity of the pump beyond an even lower value so that two different limiting reduction ratios are provided.

The system shown also includes a pressure switch P which is connected to the intake port of the pump, and this pressure switch being operated in use should the pressure at the intake port rise above a predetermined value. This can occur in over run conditions, i.e. when the vehicle, travelling at high speed, is effectively driving the engine and the motor 12 is pumping liquid through the transmission. The pressure switch P is a double switch connected in the circuits of the solenoid valves H1 and H2 to de-energize these valves these should the pressure rise above a predetermined limit. Thus, if the driver of the vehicle has selected a low gear by operating one or both of the switches S1 and S2 and an objectionable overrun condition then occurs, the switch P will open and the spring 51 will move the arm 53 clear of the sleeve 54 allowing the piston 25 to take up a position appropriate to the existing engine speed and pump outlet pressure.

The engine over-run limiting device 8 is also operated when the engine speed becomes excessive during overrun conditions. The device 8 includes a spring loaded valve member 8a through which flow from the pump 15 passes. If the flow exceeds a predetermined maximum, the valve member 8a moves and restricts flow through the line 7 connecting the inlet of pump 10 to the pressure switch P. The consequent rise in pressure in line 7 causes operation of switch P to over-ride hold low gear control.

In, a example shown in FIG. 3 the pump swash plate 111 is controlled by a piston and cylinder unit 122 comprising a cylinder 124 and a piston 125 inside the cylinder. A piston rod 126 for the piston 125 is connected to the swash plate 111. Supply of fluid from the boost line to the unit 122 is controlled by a valve spool 128 which operates inside a slidable sleeve 129 which is slidable in a body 123. The body has an inlet port 130 which communicates with the interior of the sleeve via a port 130a therein, with the body having outlet ports 131 and 132 respectively which can communicate with the interior of the sleeve through ports 131a and 132a respectively. The valve spool 128 has spaced apart lands 133 and 134 respectively co-acting with the ports 131a and 132a. The sleeve 129 is connected to the piston rod 126 by a pivoted lever 136 so that the sleeve moves to the left as the piston 125 moves to the right and vice versa.

The valve operates as follows:

If the spool 128 is moved to the left relative to the sleeve 129, the port 131a will be opened to pressure and the port 132a will be opened to drain, and the piston 125 will therefore be moved to the right decreasing the capacity of the pump. This causes movement of the sleeve 129 to the left, until the ports 131a and 132a are again closed by the lands 133, 134. Similarly, movement of the spool 128 to the right causes movement of the piston 125 to the left thereby moving the sleeve 129 to the right until equilibrium is restored.

The position of the valve spool 128 is determined by the combined effects thereon of a differential piston 138 corresponding to the piston 38 of FIG. 1, a plunger 137 corresponding to the plunger 37 of FIG. 1 and a spring 140. As in the example shown in FIG. 1, the piston 138 is sensitive to the pressure drop across an orifice 120 through which fluid pumped by an engine driven boost pump 117 flows in use. The piston 138 is secured to a cup-shaped member 141 in which a disc portion 142 on the valve spool 128 slides. The spring 140 is of conical form and is contained within the cup-shaped member 141 and acts between the base thereof and the disc portion 142. A pre-loading piston 143 is slidable in a bore in the cup-shaped member 141 and is acted upon at one end by the boost pressure and acts at the other end on the disc member 142. The piston 138, the spring 140 and the pre-loading piston 143 all urge the valve spool 128 to the right as shown in FIG. 3, i.e. in a direction to increase the stroke of the pump. The plunger 137 acts on the end of the valve spool opposite the disc portion 142 and serves to urge the valve spool 128 to the left, i.e. in a direction to decrease the pump stroke.

In use, the plunger 137 can move the valve spool 128 to the left against the spring 140, with the relationship between the pump displacement and the resulting torque being dependent on the rate of the spring 140. The rate of the spring is, in fact, variable so that the desired pressure stroke characteristic can be obtained. For any given engine speed, an upper limit is placed on the torque because of the action of the piston 138. Should the torque rise above a value such that the force applied to the valve spool by the plunger 137 is greater than the opposite force applied by the piston 138, the piston will move to the left in its cylinder and the valve spool 128 will follow this movement. In this way, the required linear relationship between the engine speed and the torque in the range 650 to 1,000 r.p.m. is attained. At 1,000 r.p.m., a relief valve 144 bridging the restrictor 120 opens and limits the pressure which can be developed across the piston 138.

For holding the transmission in selected low gears, there is a stop sleeve 144a engageable by the disc member 142 to prevent movement thereof to the right. This sleeve can be positioned axially of the valve spool by means of pins 145 mounted in a gear quadrant 146 and running in helical slots in the sleeve 144a. A rack 147 co-acts with the gear quadrant 146 to drive the sleeve 144 axially to the required position. Any suitable form of servo-mechanism can be utilized for positioning the rack 147. To prevent excessive pressure arising during overrun conditions, there is again a device sensitive to the pressure at the inlet port of the main pump and this device operates to release the servo-mechanism holding the rack 147 in its hold-low position. In addition there is a pressure connection from the inlet port of the main pump to a cylinder 148 in the body, in which cylinder a plunger 149 acting on the differential piston 138 is provided. This plunger 149 causes return of the valve spool 128 to an increased stroke position once the servo-mechanism holding the sleeve 144a in a stopped position has been released.

Having thus described our invention what we claim as new and desire to secure by Letters Patent is:-

1. An hydrostatic transmission system comprising an hydraulic pump of variable displacement arranged so as to be driven by an engine in use, a hydraulic motor connected to receive liquid from the pump and drivingly connected to vehicle wheels, said motor being arranged to be of constant displacement at least when the system is in use, an hydraulic pump displacement varying unit connected to the pump for varying the displacement thereof, a servo valve controlling the supply of pressurized liquid to the displacement varying unit, said valve including a pair or relatively movable parts which can occupy a datum position relative to one another, relative movement of said parts in one direction effecting supply of liquid to the displacement varying unit to decrease the displacement of the pump and relative movement of said parts in the opposite direction effecting supply of liquid to the displacement varying unit to increase the displacement of the pump, means sensitive to the delivery pressure of the pump and acting on said valve to urge said parts to move relativelyto one another in said one direction with a force which increases with said delivery pressure, engine speed sensing means acting on said valve to urge said parts to move relatively to one another in said opposite direction with a variable force dependent on the engine speed, and feedback means mechanically coupling the displacement varying unit to the valve so as to cause the valve parts to occupy their datum position when the pump displacement is such that the pump delivery pressure attains a value appropriate to the existing engine speed and pump capacity.

2. The system as claimed in claim 1 in which said engine speed sensing means comprises an engine-driven positive displacement hydraulic pump, an orifice through which all the liquid displaced in use by said positive displacement pump is caused to flow and a device sensitive to the pressure drop across said orifice and acting on said valve.

3. The system as claimed in claim 1 in which said device sensitive to the pressure drop across said orifice includes a differential piston with the smaller area side of the piston being connected to the engine drive positive displacement pump upstream of the orifice and the larger area side of the piston being connected downstream of the orifice, whereby no force is applied by the device to the valve when the engine speed is below a predetermined value.

4. The system as claimed in claim 1 in which the servo valve is connected to a lever, said means sensitive to the pump delivery pressure acting on one end of said lever, said engine speed sensing means acting on the opposite end of the lever and said lever being pivotable about a fulcrum movable relative to the lever by said feedback means, whereby the relative moments of the forces applied to the lever by the means sensitive to the pump delivery pressure and the engine speed sensing means respectively are varied.

5. The system as claimed in claim 4 in which said pump displacement varying unit includes a housing, a piston slidable in the housing and connected to the pump, and said feedback means comprises a rod attached to the piston and a cam attached to the rod and acting on said fulcrum, with said fulcrum being mounted for displacement relative to the housing in a direction transverse to the rod.

6. The system as claimed in claim 5 in which the lever is connected to the servo valve by a link parallel to said rod.

7. The system as claimed in claim 6 including an over-ride mechanism for holding the transmission in a low gear, said over-ride mechanism including an arm pivotally connected at one end to said rod, a spring-loaded sleeve on said link engageable by the arm intermediate the ends thereof and means for positioning the arm alternatively in an operative position in which said sleeve abuts the arm within the range of movement of the piston and an inoperative position.

8. The system as claimed in claim 1 in which said servo valve is a spool valve comprising a body, a ported sleeve slidable in said body and a spool slidable in the sleeve, said pump delivery pressure sensitive means acting on one end of the spool, said engine speed sensing means acting on the opposite end of the spool and said feed back means acting on said sleeve to displace it relative to the body.

9. The system as claimed in claim 8 including a spring-loaded sliding joint between the engine speed sensing means and the spool valve.

* * * * *